No. 732,935. PATENTED JULY 7, 1903.
W. H. GLASER.
SLIDE RULE.
APPLICATION FILED FEB. 2, 1903.
NO MODEL.
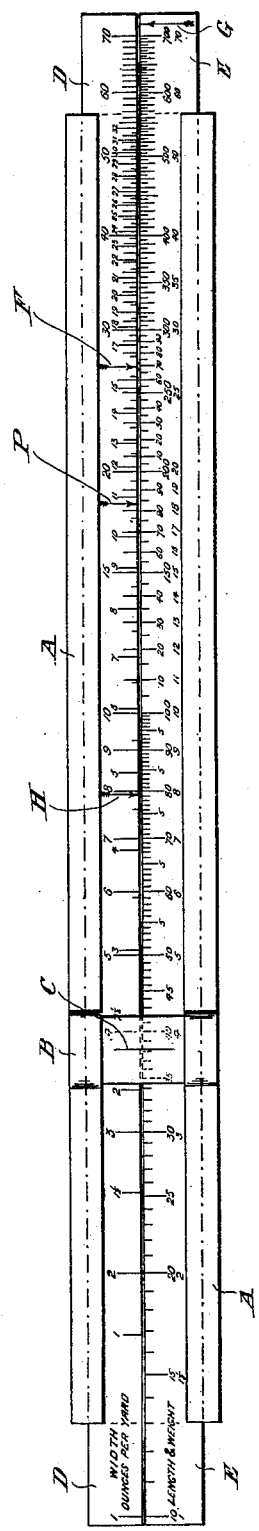
WITNESSES
Jo. M. Kuehne
J. M. Dowling
INVENTOR
William Henry Glaser
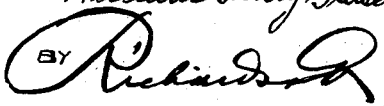
BY
ATTORNEYS
THE NORRIS PETERS CO., PHOTO-LITHO., WASHINGTON, D. C.

No. 732,935. Patented July 7, 1903.

UNITED STATES PATENT OFFICE.

WILLIAM H. GLASER, OF BRADFORD, ENGLAND.

SLIDE-RULE.

SPECIFICATION forming part of Letters Patent No. 732,935, dated July 7, 1903.

Application filed February 2, 1903. Serial No. 141,495. (No model.)

*To all whom it may concern:*

Be it known that I, WILLIAM HENRY GLASER, a subject of the King of Great Britain and Ireland, whose postal address is 2 Walmer Villas, Bradford, in the county of York, England, have invented certain new and useful Improvements in Slide-Rules, of which the following is a specification.

This invention is for improvements in slide-rules, and has for its object the construction of a slide-rule for use more particularly in the textile trade and is composed of a fixed "cursor" and two scales sliding in a frame, carrying reading-marks placed in such a manner that a comparatively short slide-rule may be produced without diminishing the range, accuracy, and easy reading of the instrument.

The instrument may be used for the following purposes: Reduction of yards length, inches width, pounds weight, to weight in grams per square meter; reduction of yards length, inches width, pounds weight, to weight in ounces per square yard; reduction of ounces per yard, inches in width, to weight in grams per square meter; reduction of yards length, pounds weight, to ounces per yard; reduction of price in shillings per yard to price per meter in any foreign currency at any rate of exchange.

In describing my invention in detail reference is made to the accompanying drawing, which represents an elevation of the instrument.

In carrying out my invention I construct a frame A, having thereon toward one end of the same a fixed cursor B, with index-line C engraved or otherwise marked thereon. Sliding in the before-mentioned frame A are two suitably-graduated scales D and E, the upper scale D having thereon two sets of graduations, one representing the widths of materials and the other the weight of material in ounces per yard, as shown on the drawing. There are also three indicating-arrows F, H, and P on the same, hereinafter referred to. The lower scale E has only one graduated scale and an indicating-arrow G at one end, the graduated scale being used for showing the length in yards and weight in pounds, grams per square meter, or ounces per square yard. In the latter case the figures "10," "20," "30," and so on, shown on scale E, will be read as "1," "2," "3," and so on.

In order to reduce yards length, inches width, and pounds weight of the material to weight in grams per square meter or ounces per square yard, the length number on scale E is set immediately under the cursor-line C and the width-number in inches on the scale D is set above and coinciding with the arrow G on the scale E. The scale D is retained in that position and the scale E moved until the weight-number on such scale is immediately under the cursor-line C. The result in grams per square meter is then indicated on scale E by arrow F and in ounces per square yard indicated on scale E by arrow H.

In order to reduce ounces per yard and inches in width of the material to weight in grams per square meter, the width-number on scale D is set so that it coincides with the arrow G on the scale E and the grams per square meter read off on scale E immediately under the given number of ounces per yard on scale D.

In order to reduce yards length and pounds weight of the material to ounces per yard, the weight-number on scale E is set immediately under the cursor-line C. Then, keeping the scale E in that position, move the scale D until the arrow F thereon coincides with the length-number on scale E and read the result on the ounces-graduations on scale D immediately under the cursor-line C.

In order to reduce the price in shillings per yard of the material to price per meter in any foreign currency at any rate of exchange, the arrow P on scale D is set to coincide with the number representing the price in shillings and decimals of a shilling per yard on scale E, and the figures on the scale immediately under the number representing the required rate of exchange on scale D will give the required price per meter in the required foreign currency.

What I claim as my invention is—

In combination in a slide-rule, a frame, a cursor connected to the frame and two scales sliding in the frame, substantially as described.

In witness whereof I have hereunto set my hand in the presence of two witnesses.

W. H. GLASER.

Witnesses:
B. C. JOLLEY,
W. H. JOLLEY.